(12) United States Patent
Cattoz et al.

(10) Patent No.: US 11,136,429 B2
(45) Date of Patent: Oct. 5, 2021

(54) METHOD OF MAKING POLYMERS

(71) Applicant: Infineum International Limited, Abington (GB)

(72) Inventors: Beatrice Nicole Cattoz, Abington (GB); Anthony James Strong, Abington (GB); Daniel Phillips, Abington (GB); Andrew Schwarz, Abington (GB); Remzi Becer, London (GB); Valentin Beyer, London (GB)

(73) Assignee: INFINEUM INTERNATIONAL LIMITED

( * ) Notice: Subject to any disclaimer, the term of this patent is extended or adjusted under 35 U.S.C. 154(b) by 260 days.

(21) Appl. No.: 16/575,968

(22) Filed: Sep. 19, 2019

(65) Prior Publication Data
US 2020/0095362 A1    Mar. 26, 2020

(30) Foreign Application Priority Data
Sep. 24, 2018 (EP) ..................... 18196371

(51) Int. Cl.
*C08F 293/00* (2006.01)
(52) U.S. Cl.
CPC ...... *C08F 293/005* (2013.01); *C08F 2810/40* (2013.01)
(58) Field of Classification Search
CPC .. C08F 220/28; C08F 220/26; C08F 2810/40; C08F 293/005; C10M 151/02; C10M 2221/02
See application file for complete search history.

(56) References Cited

U.S. PATENT DOCUMENTS 11,059,924 B2 * 7/2021 Cattoz ................. C08F 2/38
2010/0010178 A1   1/2010 Balk et al.
2017/0298162 A1 * 10/2017 Jacobine ............ C07C 31/20

FOREIGN PATENT DOCUMENTS

WO    WO 2016/111743 A1    7/2016

OTHER PUBLICATIONS

Tsarevsky et.al., "Reversible Redox Cleavage/Coupling of Polystyrene Disulfide or Thiol Groups Prepared by ATRP," Macromolecules, 35(4), 9009-14, Nov. 19, 2002.
European Search Report for EP Application No. 18196371.1, to which priority is claimed, dated Mar. 26, 2019.

* cited by examiner

*Primary Examiner* — Mark S Kaucher

(57) ABSTRACT

A method of making a polymer having the structure (I):

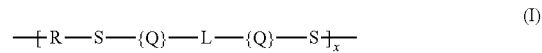

wherein L is a linking group, R is a hydrocarbon group or a substituted-hydrocarbon group, and x is 2 or more, preferably from 2 to 100, more preferably from 2 to 50; and wherein each {Q} is an identical polymer block or contains a plurality of polymer blocks. The method comprises reacting a di-halo initiator with a selected monomer one or more times and then reacting the resulting moiety with a dithiol compound of the structure HS—R—SH.

17 Claims, No Drawings

METHOD OF MAKING POLYMERS

This invention relates to a method of making polymers and in particular to, making amphiphilic block polymers. Among other uses, the polymers may be useful as additives for lubricants such as lubricating oil compositions used to lubricate the crankcase of spark-ignited and compression-ignited internal combustion engines.

There is much interest in methods to synthesise block polymers with controlled polymer architectures. Significant efforts are being made to develop new synthetic methods in order to obtain sequence-controlled, sequence-defined and multiblock co-polymer architectures.

In a first aspect, the invention provides a method of making a polymer having the structure (I):

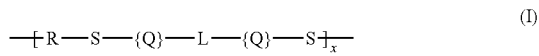

wherein L is a linking group, R is a hydrocarbon group or a substituted-hydrocarbon group, and x is 2 or more, preferably from 2 to 100, more preferably from 2 to 50; and wherein each {Q} contains a plurality of polymer blocks, such that the moiety {Q}-L-{Q} has the structure {$P_n$ ... $P_2P_1$}-L-{$P_1P_2$ ... $P_n$} where each $P_n$ is an individual polymer block, the number of polymer blocks n in each {Q} being the same; wherein for each value of n the polymer blocks are identical; and wherein n is an integer of 2 or more, preferably from 2 to 100, more preferably from 2 to 50; the method comprising:

reacting, in the presence of a catalyst comprising a transition metal-ligand complex, a di-halo initiator of the structure halo-L-halo, where halo is Br, Cl, or I, preferably Br, with a monomer of structure (II), or a mixture of two or more different monomers of structure (II):

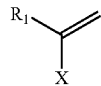

wherein $R_1$ or each $R_1$ is independently hydrogen or methyl; wherein X or each X is independently a hydrocarbon group having from 1 to 50, preferably 1 to 30 carbon atoms, a substituted-hydrocarbon group having from 1 to 50, preferably 1 to 30 carbon atoms, $COOR_2$, $COSR_2$, $CONR_2R_3$, $OCOR_2$, $CONHR_2$, CN, $COSiR_2R_3R_4$ or Cl, wherein $R_2$, $R_3$ and $R_4$ are independently hydrogen, a hydrocarbon group having from 1 to 50, preferably 1 to 30 carbon atoms, or a substituted-hydrocarbon group having from 1 to 50, preferably 1 to 30 carbon atoms, to form a di-halo moiety with the structure halo-$P_1$-L-$P_1$-halo, where $P_1$ is a polymer block formed from at least 3 monomers of structure (II);

(ii) repeating step (i), between 1 and n times, each time n, reacting, in the presence of a catalyst as described in step (i), the di-halo moiety formed in the previous step with a further monomer of structure (II) and different from the monomer of structure (II) used in the previous step, or a mixture of two or more different monomers of structure (II) and different from the mixture of two or more different monomers of structure (II) used in the previous step, to form a di-halo moiety with the structure halo-{$P_n$ ... $P_2P_1$}-L-{$P_1P_2$ ... $P_n$}-halo, where each $P_n$ is a polymer block formed from at least 3 monomers of structure (II), and n is an integer of 2 or more, preferably from 2 to 100, more preferably from 2 to 50; and (iii) reacting the di-halo moiety formed in step (ii), with a dithiol compound of the structure HS—R—SH.

Preferably, step (iii) is conducted in the presence of a base. Although reaction of the di-halo moieties with the dithiol compound will proceed in the absence of a base in step (iii), conversion to the final polymer will be more efficient if a base is present.

The number of polymer blocks in each {Q} present in the polymers, that is, the value of n in $P_n$ ... $P_2P_1$, is at least 2 and may for example be from 2 to 50, such as from 2 to 10. In preferred embodiments, polymers made according to embodiment (b) have 2, 3, 4 or 5 copolymer blocks in each {Q}, more preferably 2 or 3.

Each polymer block in {Q} is formed from at least 3 monomers of structure (II) but otherwise may be of any suitable size, but each are the same size in each instance of {Q}. Polymer blocks are comprised of repeat monomer units and there may be for example from 3 to 100 repeat monomer units in a block, preferably 3 to 50, more preferably 5 to 30, for example 5 to 20. Polymer blocks containing more than 100 repeat monomer units are also possible. The polymer blocks may be formed from only one type of monomer, that is where only one monomer of structure (II) is used in step (i). Such polymer blocks will be home-polymer blocks. Alternatively, polymer blocks may be formed from more than one type of monomer, that is where a mixture of two or more monomers of structure (II) are used in step (i). Such polymer blocks will be co-polymer blocks. Preferably, each polymer block in {Q} is a homo-polymer block. Each polymer block is preferably a homo-polymer block although structures where each polymer block is a co-polymer block, or where one or more polymer blocks are homo-polymer blocks and one or more polymer blocks are co-polymer blocks are also possible. Adjacent blocks in each {Q} are different and are arranged in a symmetrical fashion around linking group L. So for example, if one polymer block is designated A and a second polymer block is designated B, then examples of moiety {Q}-L-{Q} include AB-L-BA, BA-L-AB, ABA-L-ABA, BAB-L-BAB, and the like. And if a third polymer block C is used then moiety {Q}-L-{Q} may for example be ABC-L-CBA, CBA-L-ABC, ABCA-L-ACBA, ABCABC-L-CBACBA, and the like. It will be understood that fourth, fifth, and further polymer blocks (D, E . . . ) may be included following the same pattern. Arrangements such as AAB-L-BAA, ABB-L-BBA, and the like have adjacent polymer blocks which are identical so are simply equivalent to examples of moiety {Q}-L-{Q} containing a larger polymer block of a particular type. For example, AAB-L-BAA is equivalent to AB-L-BA as the repeated block of monomer A is equivalent to a larger polymer block of type A. Not included as examples of moiety {Q}-L-{Q} are arrangements such as AB-L-AB, ABC-L-ABC, and the like as the polymer blocks in these moieties are not arranged in a symmetrical fashion around linking group L.

Each polymer block in {Q} has the structure (III):

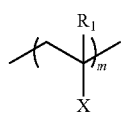

wherein m is an integer of at least 3; where $R_1$ and X are as defined hereinabove; and wherein in each block having structure (III), each $R_1$, each X and each m may be the same or different. As discussed above, polymer blocks may be a homo-polymer blocks in which case, each $R_1$ and each X will be the same for each value of m. Alternatively when polymer blocks are co-polymer blocks formed from two or more monomers of structure (II), $R_1$, X or both will vary for different values of m. Preferably, polymer blocks of structure (III) are homo-polymer blocks.

Hydrocarbon groups are groups which contain hydrogen and carbon only. These include aliphatic, alicyclic, polycyclic, aromatic, polyaromatic, aliphatic- and alicyclic-substituted aromatic and polyaromatic, and aromatic-substituted aliphatic and alicyclic and polycyclic groups. Examples include straight-chain or branched alkyl groups and straight-chain or branched alkenyl groups; cycloalkyl and cycloakenyl groups, alkylcycloalkyl groups, alkenylcycloalkyl groups, alkylcycloalkenyl groups and alkenylcycloalkenyl groups; aryl groups such as phenyl and naphthyl, alkylaryl and alkenylaryl groups such as alkylphenyl and alkenylphenyl; arylalkyl and arylalkenyl groups such as benzyl and phenylalkyl where the alkyl (or alkenyl) groups may be straight-chain or branched.

Substituted-hydrocarbon groups include all the types of groups defined above as hydrocarbon groups which also contain one or more hetero-atoms. The hetero-atoms may be present as functional groups such as hydroxy, alkoxy, acyl, nitro, cyano and thiol or atoms such as oxygen, nitrogen and sulphur may be present in a carbon chain or ring otherwise composed of carbon atoms, for example, pyridines, pyrrolidine, piperidine, piperazine, pyridazine, pyrazine, pyrrole, pyrazole, pyrimidine, azepane, azepine, imidazole, tetrazole, quinoline, indole, benzotriazole, benzoimidazole, furan, benzofuran, oxazoline, oxazole, isoxazole, benzoxazole, morpholine, oxazolidine, isoxazolidine, pyrrolidone, piperidinone, benzothiazole, thiophene and benzothiophene. Polyalkylene glycol groups and ether groups are examples of substituted-hydrocarbon groups.

Hydrocarbon and substituted-hydrocarbon groups also include those derived from mixtures of compounds where molecules having different numbers of carbon atoms are present. For example, hydrocarbon groups derived from natural sources such as mineral oils or natural oils or fats are typically mixtures of molecules with a range of carbon chain-lengths. It will be understood that reference to the number of carbon atoms when used in this specification also includes such mixtures in which cases, the number of carbon atoms refers to the average number of carbon atoms in the mixture. For example, a mixture containing equal amounts molecules with 10 carbon atoms and molecules with 14 carbon atoms will have an average carbon number of 12. Similar, polyalkylene glycol groups and ether groups may be mixtures containing a mime of molecules with differing numbers of repeat units. For example, for polyethylene glycol groups having the formula $[(CH_2CH_2O]_zOH$, z represents the average number of $[(CH_2CH_2O]$ moieties present in the mixture.

Each {Q} in the polymer is composed of a plurality of polymer blocks of structure (III), the moiety {Q}-L-{Q} has the structure (IV):

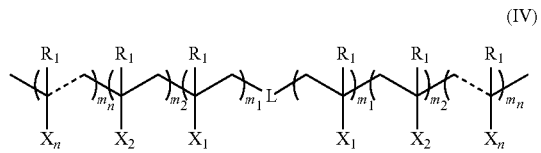

(IV)

wherein each $m_1, m_2 \ldots m_n$ is independently an integer of at least 3. $X_1, X_2 \ldots X_n$ are independently as defined as X hereinabove. Preferably, each $m_1, m_2 \ldots m_n$ is independently an integer from 3 to 100, more preferably 3 to 50, even more preferably 5 to 30, for example 5 to 20.

The number of polymer blocks in structure (IV), that is the value of n in $m_1, m_2 \ldots m_n$, is at least 2 and may for example be from 2 to 50, such as from 2 to 10. In preferred embodiments, structure (IV) contains 2, 3, 4 or 5 polymer blocks, more preferably 2 or 3.

In an embodiment, $X_1, X_2 \ldots X_n$ are $COOR_2$ where in each instance n, $R_2$ is a straight-chain or branched alkyl group. In this embodiment, when each $R_1$ is hydrogen, each polymer block is a polyacrylate, and when each $R_1$ is methyl, each polymer block is a polymethacrylate. Polymers containing both polyacrylate blocks and polymethacrylate blocks are possible when in at least one instance n, $R_1$ is hydrogen and in at least another instance n, $R_1$ is methyl. Preferably each $R_1$ is hydrogen.

In another embodiment, $X_1, X_2 \ldots X_n$ are $COOR_2$ where in each instance n, $R_2$ is a polyalkylene glycol residue of the formula $—[(CR_5H)_yO]_zOR_6$ where y is an integer from 2 to 4, preferably 2, z is the average number of $[(CR_5H)_yO]$ moieties and is from 2 to 100, preferably 2 to 20, for example from 2 to 10, and $R_5$ is hydrogen or an alkyl group such as methyl or ethyl. Preferably $R_5$ is hydrogen. $R_6$ is hydrogen, an alkyl group such as methyl or ethyl or an aryl group such as phenyl, Preferably $R_6$ is methyl. In this embodiment, when each $R_1$ is hydrogen, each polymer block is a polyalkyleneglycol acrylate, and when each $R_1$ is methyl, each polymer block is a polyalkyleneglycol methacrylate. Preferably, y is 2 such that the polymer blocks are either polyethyleneglycol acrylates or polyethyleneglycol methacrylates. In preferred embodiments, y is 2 and z is 2 such that the polymer blocks are either diethyleneglycol acrylates or diethyleneglycol methacrylates. In other preferred embodiments, y is 2 and z is an average value of 7 to 8 such that the polymer blocks are either oligoethyleneglycol acrylates or oligoethyleneglycol methacrylates. Polymers containing both polyalkyleneglycol acrylate blocks and polalkyleneglycol methacrylate blocks are possible when in at least one instance n, $R_1$ is hydrogen and in at least another instance n, $R_1$ is methyl. Preferably each $R_1$ is hydrogen. Preferably each $R_6$ is methyl.

In another embodiment, $X_1, X_2 \ldots X_n$ are $CONR_2R_3$ where in each instance n, $R_2$ and $R_3$ are hydrogen. In this embodiment, when each $R_1$ is hydrogen, each polymer block is a polyacrylamide, and when each $R_1$ is methyl, each polymer block is a polymethacrylamide. Polymers containing both polyacrylamide blocks and polymethacrylamide blocks are possible when in at least one instance n, $R_1$ is hydrogen and in at least another instance n, $R_1$ is methyl. Preferably each $R_1$ is hydrogen. In an analogous fashion, one or both of $R_2$ and $R_3$ may be hydrocarbon groups or substituted-hydrocarbon groups as defined hereinabove.

In another embodiment, $X_1, X_2 \ldots X_n$ are $COSR_2$ where in each instance n, $R_2$ is a straight-chain or branched alkyl group. In this embodiment, when each $R_1$ is hydrogen, each polymer block is a polythioacrylate, and when each $R_1$ is methyl, each polymer block is a polythiomethacrylate. Polymers containing both polythioacrylate blocks and polythiomethacrylate blocks are possible when in at least one instance n, $R_1$ is hydrogen and in at least another instance n, $R_1$ is methyl. Preferably each $R_1$ is hydrogen.

In preferred embodiment, $X_1, X_2 \ldots X_n$ are $COOR_2$ and n is at least 2. In this embodiment in at least one instance n, $R_2$ is a straight-chain or branched alkyl group, and in at least one other instance n, $R_2$ is a polyalkylene glycol residue of the formula —$[(CR_5H)_yO]_zOR_6$ where y, z, $R_5$ and $R_6$ are as described hereinabove. Preferably $R_5$ is hydrogen. Preferably $R_6$ is methyl.

In a preferred embodiment of structure (IV), each $R_1$ is hydrogen, $X_1, X_2 \ldots X_n$ are $COOR_2$ and n is 2. In one instance n, $R_2$ is a branched alkyl group and in the other instance n, $R_2$ is a polyalkylene glycol residue of the formula —$[(CR_5H)_yO]_zOR_6$ where y, z, $R_5$ and $R_6$ are as described hereinabove. Preferably $R_5$ is hydrogen. Preferably $R_6$ is methyl. In this embodiment, the branched alkyl group is preferably 2-ethylhexyl. The polyalkylene glycol residue is preferably a polyethylene glycol residue (where y is 2) and is preferably a diethylene glycol residue (where y is 2 and z is 2) or an oligoethylene glycol residue (where y is 2 and z is an average of 7 to 8). In a particularly preferred embodiment of structure (IV), each $R_1$ is hydrogen, $X_1, X_2 \ldots X_n$ are $COOR_2$ and n is 2; in one instance n, $R_2$ is 2-ethylhexyl; and in the other instance n, $R_2$ is a polyalkylene glycol residue of the formula —$[(CR_5H)_yO]_zOMe$ where y is 2, z is 2. In another particularly preferred embodiment of structure (IV), each $R_1$ is hydrogen, $X_1, X_2 \ldots X_n$ are $COOR_2$ and n is 2; in one instance n, $R_2$ is 2-ethylhexyl; and in the other instance n, $R_2$ is a polyalkylene glycol residue of the formula —$[(CR_5H)_yO]_zOMe$ where y is 2, z is an average of 7 to 8.

In another preferred embodiment of structure (IV), each $R_1$ is hydrogen, $X_1, X_2 \ldots X_n$ are $COOR_2$ and n is 3. In one instance n, $R_2$ is a branched alkyl group and in the other two instances n, $R_2$ is a polyalkylene glycol residue of the formula —$[(CR_5H)_yO]_zOR_6$ where y, z, $R_5$ and $R_6$ are as described hereinabove. Preferably $R_5$ is hydrogen. Preferably $R_6$ is methyl. Preferably in each of these two instances n, each polyalkylene glycol residue $R_2$ is the same. In this embodiment, the branched alkyl group is preferably 2-ethylhexyl. The polyalkylene glycol residues are preferably polyethylene glycol residues (where y is 2) and are preferably diethylene glycol residues (where y is 2 and z is 2) or oligoethylene glycol residues (where y is 2 and z is an average of 7 to 8). In a particularly preferred embodiment of structure (IV), each $R_1$ is hydrogen, $X_1, X_2 \ldots X_n$ are $COOR_2$ and n is 3; in one instance n, $R_2$ is 2-ethylhexyl; and in the other two instances n, each $R_2$ is a polyalkylene glycol residue of the formula —$[(CH_2)_yO]_zOMe$ where y is 2, z is 2. In another particularly preferred embodiment of structure (IV), each $R_1$ is hydrogen, $X_1, X_2 \ldots X_n$ are $COOR_2$ and n is 3; in one instance n, $R_2$ is 2-ethylhexyl; and in the other two instances n, each $R_2$ is a polyalkylene glycol residue of the formula —$[(CH_2)_yO]_zOMe$ where y is 2, z is an average of 7 to 8. In an alternative embodiment, in two instances, $R_2$ is a branched alkyl group and in one instance, $R_2$ is a polyalkylene glycol residue, both as defined above.

The di-halo initiator of the structure halo-L-halo is effective to initiate polymerisation of the monomers used to form the polymer blocks but otherwise the choice of initiator is not critical. Suitable are compounds such as di-halo terminated hydrocarbon groups and substituted-hydrocarbon groups defined hereinabove. Such di-halo initiator molecules are well known in the art. Di-bromo compounds are preferred. Examples of di-halo initiators of the structure halo-L-halo suitable for use in the present invention include:

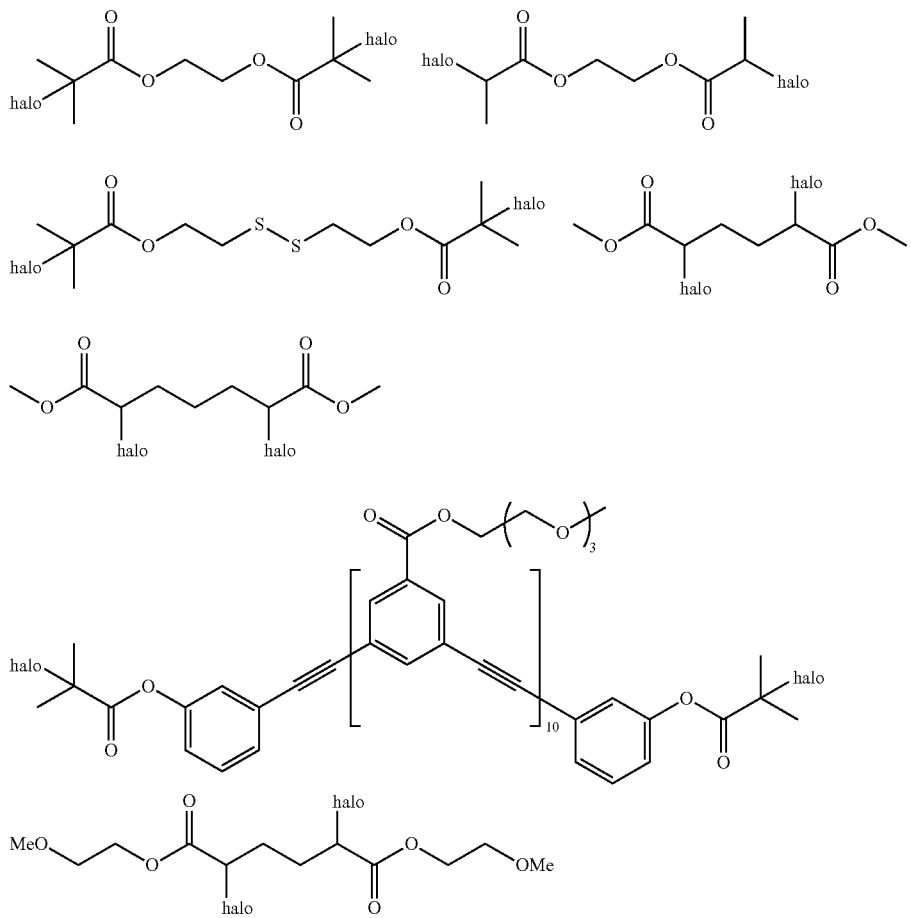

-continued

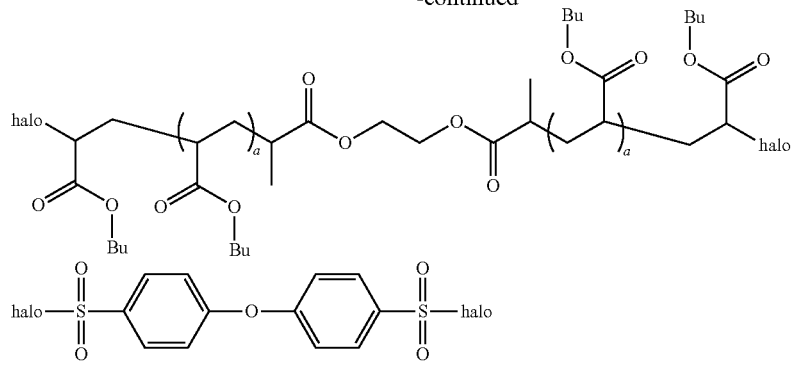

where halo is Br, Cl or I, preferably Br, and where a is an integer from 1 to 100, preferably from 1 to 30, for example, from 1 to 10.

The choice of dithiol compound of the structure HS—R—SH is also not critical. Suitable are compounds which are di-thiol-terminated hydrocarbon groups and substituted-hydrocarbon groups defined hereinabove. Examples of hydrocarbon groups are straight-chain and branched alkyl groups, alkenyl groups, cycloalkyl groups, cycloalkenyl groups, alkylcycloalkyl groups, alkenylcycloalkyl groups, alkylcycloalkenyl groups, alkenylcycloalkenyl groups, aryl groups, alkylaryl groups, alkenylaryl groups where the alkyl or alkenyl substituent(s) may be straight-chain or branched. Examples of substituted-hydrocarbon groups are the groups defined above containing one or more hetero-atoms. These hetero-atoms may be present as functional groups such as hydroxy, alkoxy, acyl, nitro, cyano and thiol or atoms such as oxygen, nitrogen and sulphur may be present in a carbon chain or ring otherwise composed of carbon atoms, or as a connecting atom between two or more hydrocarbon or substituted-hydrocarbon groups.

Specific examples of dithiol compounds of the structure HS—R—SH useful in the present invention include:
HS—CH$_2$—CH$_2$—SH
HS—CH$_2$—CH$_2$—CH$_2$—SH
HS—CH$_2$—CH$_2$—CH$_2$—CH$_2$—SH etc.
HS—CH$_2$—Z—CH$_2$—SH
HS—CH$_2$—CH$_2$—Z—CH$_2$—CH$_2$—SH etc. Z=S, O, NH

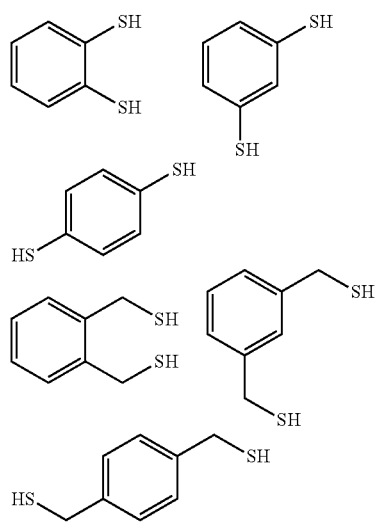

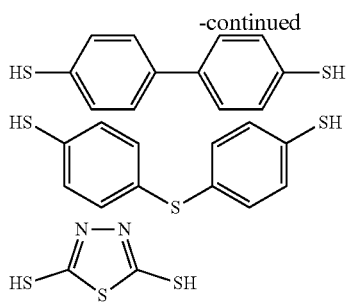

It will be understood that numerous other compounds HS—R—SH will also be suitable. With reference to structure (I) above, each moiety {Q}-L-{Q} is linked together by a bisthiol residue —S—R—S— to form repeating units in the polymer. Those skilled in the art will recognise that the critical factor is the presence of the bisthiol residue and not the particular nature of the group R.

The catalyst used in steps (i) and (ii) is a transition metal-ligand complex. The choice of transition metal is not critical provided that it can exist in two stable oxidation states separated by one electron. Suitable transition metals thus include copper, iron, nickel, titanium, cobalt, molybdenum, ruthenium and rhodium. Preferably, the transition metal-ligand complex is a copper-ligand complex.

The ligand used to form the transition metal-ligand complex solubilises the transition metal species in the reaction medium and alters the redox potential of the metal complex. The mechanism of the reaction in steps (i) and (ii) involves halogen exchange between the di-halo moiety and the transition metal-ligand complex and the ligand acts to control the kinetics of this exchange. Suitable ligands include, but are not limited to, nitrogen-based ligands such as amines and imines; phosphines and dithiocarbamates. Preferably, the ligand used to form the transition metal-ligand complex is a nitrogen-containing ligand, more preferably a multidentate nitrogen-containing ligand. Such ligands co-ordinate to the transition metal via nitrogen atoms and are known in the art. Non-limiting examples include tris(2-dimethylaminoethyl) amine (Me$_6$TREN), propyl(2-pyridyl)methanimine (PrPMI), 2,2'-bipyridine (bpy), 1,1,4,7,10,10-hexamethyltriethylenetetramine (HMTETA), 4,4'-di-5-nonyl-2,2'-bipyridine (dNbpy), N,N,N',N',N''-pentamethyldiethylenetriamine (PMDETA), tris[(2-pyridyl)methyl]amine (TPMA), 4,11-dimethyl-1,4,8,11-tetraazabicyclo-[6.6.2]hexadecane (DMCBCy) and tris((4-methoxy-3,5-dimethylpyridin-2-yl)methyl)amine (TMDPMA). Other suitable ligands can be found in FIG. 4 of *Macromolecules* 2012, 45, pp. 4015-

4039. Preferably, the ligand used to form the transition metal-ligand complex is tris(2-dimethylaminoethyl)amine (Me$_6$TREN).

In a preferred embodiment the catalyst used in steps (i) and (ii) is a copper complex of Me$_6$TREN.

When a base is used in step (iii) it may be any suitable organic or inorganic base. Examples of organic bases include alkylamines such as triethylamine, and cyclic amines such as 7-methyl-1,5,7-triazabicyclodec-5-ene and 1,8-diazabicyclo[5.4.0]undec-7-ene. Examples of inorganic bases include potassium carbonate, alkali metal hydrides and lithium diisopropyl amide, Other bases, both organic and inorganic, will be known to those skilled in the art. Preferably, the base, when used in step (iii), is an organic base. More preferably, the base, when used in step (iii) is an alkylamine, most preferably triethylamine.

In a particularly preferred embodiment, the catalyst used in steps (i) and (ii) is a copper complex of Me$_6$TREN and step (iii) is conducted in the presence of triethylamine.

In a subsequent stage, the moiety Br—{P$_2$P$_1$}-L-{P$_1$P$_2$}—Br is treated with a bisthiol compound SH—R—SH, optionally in the presence of a base, to initiate a "thio-bromo click" reaction whereby moieties Br—{P$_2$P$_1$}-L-{P$_1$P$_2$}—Br are joined together by S—R—S moieties, with the elimination of HBr.

It will be readily apparent that analogous polymers where each {Q} has multiple copolymer blocks {P$_n$ . . . P$_2$P$_1$} can be produced by simply repeating the first stage using a further or different monomer and each time utilising the moiety Br—{P$_n$ . . . P$_2$P$_1$}-L-{P$_1$P$_2$ . . . P$_n$}—Br as the di-bromo initiator.

A non-limiting example of a polymer made according to the method of the present invention has the following structure, where 'EH' is a 2-ethylhexyl group, 'PEG' is a polyethylene glycol group, for example a diethylene glycol group or an oligoethylene glycol group, m$_1$, m$_2$ and m$_3$ are independently from 3 to 100, for example 5 to 20, and x is from 2 to 100, for example 2 to 15:

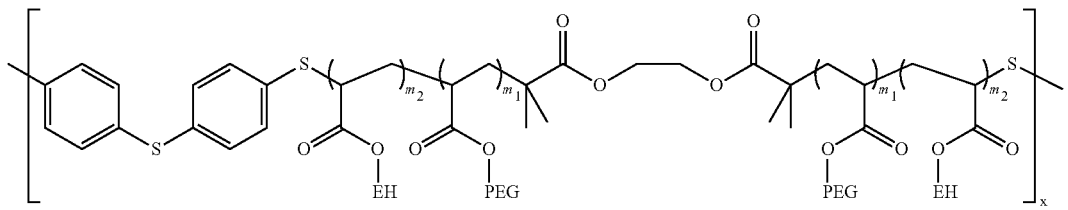

30

The transition metal-ligand complex used as the catalyst may be pre-formed and added to the reaction mixture comprising the di-halo moiety and the monomer of structure (II) in steps (i) and (ii) but it is preferable that the catalyst is formed in-situ. This can be achieved by adding one or more transition metals or transition metal compounds together with the ligand to the reaction mixture comprising the di-halo moiety and the monomer of structure (II) in steps (i) and (ii). For example, the preferred catalyst of a copper complex of Me$_6$TREN may be generated in-situ by adding Me$_6$TREN to the reaction mixture together with copper metal or a copper(I) halide (e.g. CuBr) or a copper(II) halide (e.g. CuBr$_2$), or any combination of these or equivalent copper compounds.

Polymer Synthesis

Examples of the method of the present invention will be described with reference to polymers comprised of acrylate polymer blocks, or of acrylate polymer blocks and ethyleneglycol acrylate polymer blocks, however those skilled in the art will recognise that the synthesis is equally applicable to polymers comprised of the other types of polymer block described hereinabove.

To produce a polymer wherein each {Q} in structure (I) contains two copolymer blocks P$_1$ and P$_2$, an acrylate monomer is first polymerised by initiating polymerisation using a di-bromo initiator of the structure Br-L-Br, where L is the linking group described hereinabove, in the presence of a transition metal-ligand complex. Equivalent di-chloro or di-iodo initiators could also be used. The resulting moiety has the structure Br—{P$_1$}-L-{P$_1$}—Br, where each (P$_1$) is an identical polyacrylate copolymer block. An ethyleneglycol acrylate monomer is then polymerised in the same fashion, the moiety Br—{P$_1$}-L-{P$_1$}—Br acting as the di-bromo initiator. This results in a moiety having the structure Br—{P$_2$P$_1$}-L-{P$_1$P$_2$}—Br where each P$_2$ is an identical polyethyleneglycol acrylate copolymer block.

made by reacting in a first step, in the presence of a transition metal-ligand complex, a di-bromo initiator of the structure:

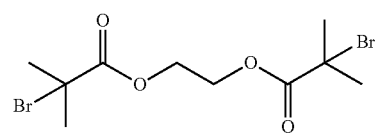 [SMILES: CC(C)(Br)C(=O)OCCOC(=O)C(C)(C)Br]

with polyethylene glycol acrylate to form:

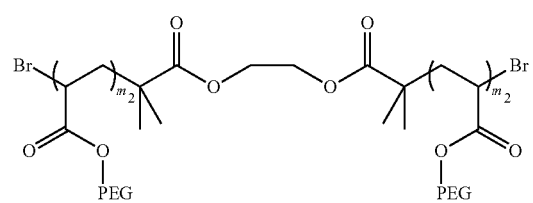

which is then utilised as a di-bromo initiator and reacted, in the presence of a transition metal-ligand complex, with 2-ethylhexyl acrylate to form:

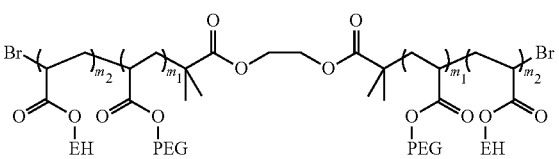

which is then reacted in a further step, in the presence of an organic base, with 4, 4'-thiobenzenethiol:

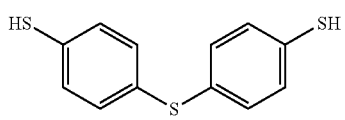 [SMILES: Sc1ccc(Sc2ccc(S)cc2)cc1]

to form the final polymer via the elimination of HBr.

WORKED EXAMPLES

Synthesis of Polyacrylate Polymers

The Table below details polymers made according to the method of the present invention. All were made using the reactants listed in the Table.

Step (i)

Monomer 1, ethylene glycol-derived bisinitiator [see below *] (1.00 equiv.), tris(2-dimethylaminoethyl)amine (Me$_6$TREN) (0.36 equiv.), CuBr$_2$ (0.10 equiv.) and DMSO (50% v/v) were charged to a Schlenk tube and sealed with a rubber septum. After degassing the reaction mixture for 30 minutes, a stirring bar wrapped with pre-activated copper wire (5 cm) was added to the reaction mixture in a counter-current of nitrogen. As described above, the copper species and the Me$_6$TREN form a copper-ligand complex in situ. The tube was sealed again and the reaction mixture stirred at 25° C. until full conversion was observed (between 4 and 12 hours). Conversion was measured by 1H NMR spectroscopy and SEC analysis was carried out with samples diluted in THF which were filtered over basic alumina prior to analysis to remove residual copper species.

Step (ii)

Monomer 2 in DMSO (50% v/v) and another portion of Me$_6$TREN (0.36 equiv.) and CuBr$_2$ (0.10 equiv.) were added into a glass vial and degassed for 30 minutes before transferring to the reaction mixture from Stage 1. The tube was sealed again and the reaction mixture stirred at 25° C. until full conversion was observed.

Step (iii)

After full monomer conversion, a solution of bisthiol (1.00 equiv.) and triethylamine in DMF was added at ambient temperature to the reaction mixture. The mixture was then stirred overnight at room temperature before SEC analysis was carried out. The crude product was purified by filtration over basic alumina followed by precipitation from cold methanol to provide the pure polymer as a yellowish oil. The polymer obtained was characterised by 1H NMR and GPC with RI and UV detectors.

The structures of the polymers obtained are given below the Table.

In each case, the ethylene glycol derived bisinitiator was the following compound:

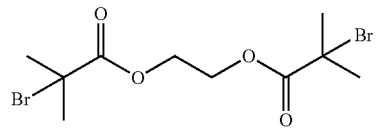 [SMILES: CC(C)(Br)C(=O)OCCOC(=O)C(C)(C)Br]

| | Monomer 1 | Monomer 2 | bisthiol | Mn(g/mol) | Đ |
|---|---|---|---|---|---|
| Polymer 1 | PEG | EH | 4,4'-thiodibenzenethiol | 55900 | 2.42 |
| Polymer 2 | PEG | EH | 4,4'-thiodibenzenethiol | 74800 | 2.57 |

PEG: polyethylene glycol acrylate (Mn of polyethylene glycol group = 480 g/mol)
EH: 2-ethylhexyl acrylate Structure of Polymer 1

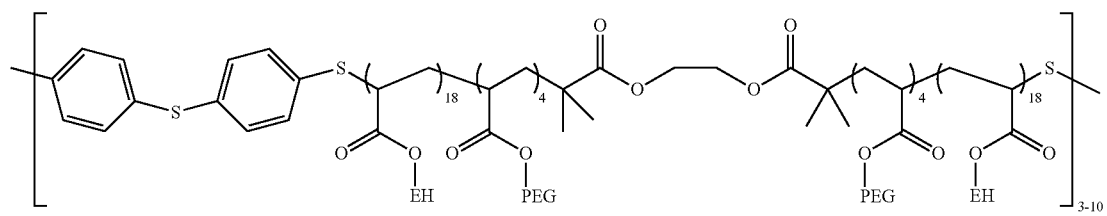

Structure of Polymer 2

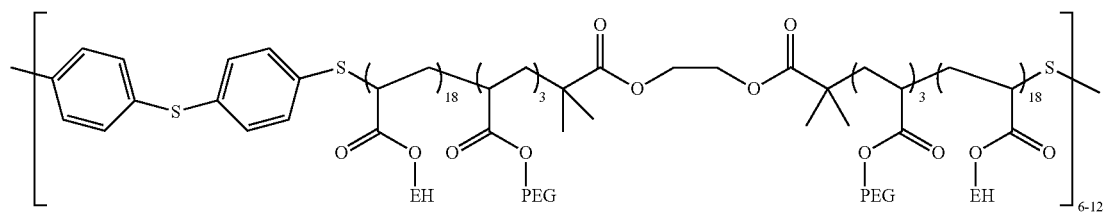

The invention claimed is:

1. A method of making a polymer having the structure (I):

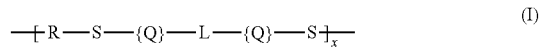

wherein L is a linking group, R is a hydrocarbon group or a substituted-hydrocarbon group, and x is 2 or more; and wherein each {Q} contains a plurality of polymer blocks, such that the moiety {Q}-L-{Q} has the structure {P$_n$ ... P$_2$P$_1$}-L-{P$_1$P$_2$, ... P$_n$} where each P$_n$ is an individual polymer block, the number of polymer blocks n in each {Q} being the same; wherein for each value of n the polymer blocks are identical; and wherein n is an integer of 2 or more;

the method comprising:

(i) reacting, in the presence of a catalyst comprising a transition metal-ligand complex, a di-halo initiator of the structure halo-L-halo, where halo is Br, Cl, or I, with a monomer of structure (II), or a mixture of two or more different monomers of structure (II):

   (II)

wherein R$_1$ or each R$_1$ is independently hydrogen or methyl; wherein X or each X is independently a hydrocarbon group having from 1 to 50 carbon atoms, a substituted-hydrocarbon group having from 1 to 50 carbon atoms, COOR$_2$, COSR$_2$, CONR$_2$R$_3$, OCOR$_2$, CONHR$_2$, CN, COSiR$_2$R$_3$R$_4$ or Cl, wherein R$_2$, R$_3$ and R$_4$ are independently hydrogen, a hydrocarbon group having from 1 to 50 carbon atoms, or a substituted-hydrocarbon group having from 1 to 50 carbon atoms, to form a di-halo moiety with the structure halo-P$_1$-L-P$_1$-halo, where P$_1$ is a polymer block formed from at least 3 monomers of structure (II);

(ii) repeating step (i), between 1 and n times, each time n, reacting, in the presence of a catalyst as described in step (i), the di-halo moiety formed in the previous step with a further monomer of structure (II) and different from the monomer of structure (II) used in the previous step, or a mixture of two or more different monomers of structure (II) and different from the mixture of two or more different monomers of structure (II) used in the previous step, to form a di-halo moiety with the structure halo-{P$_n$ ... P$_2$P$_1$}-L-{P$_1$P$_2$ ... P$_n$}-halo, where each P$_n$ is a polymer block formed from at least 3 monomers of structure (II), and n is an integer of 2 or more; and (iii) reacting the di-halo moiety formed in step (i) or if step (ii) is used, the moiety formed in step (ii), with a dithiol compound of the structure HS—R—SH.

2. A method according to claim 1, wherein each X is COOR$_2$, wherein in at least one instance, R$_2$ is a straight-chain or branched alkyl group, and wherein in at a least one other instance, R$_2$ is a polyalkylene glycol residue of the formula —[(CR$_5$H)$_y$O]$_z$OR$_6$ where y is an integer from 2 to 4, and z is the average number of [(CR$_5$H)$_y$O] moieties and is from 2 to 100, R$_5$ is hydrogen or an alkyl group and R$_6$ is hydrogen, an alkyl group or an aryl group.

3. A method according to claim 1, wherein step (ii) is repeated once and each X is COOR$_2$, wherein in one instance, R$_2$ is a branched alkyl group, and wherein in the other instance, R$_2$ is a polyalkylene glycol residue of the formula —[(CR$_5$H)$_y$O]$_z$OR$_6$ where y is an integer from 2 to 4, and z is the average number of [(CR$_5$H)$_y$O] moieties and is from 2 to 100, R$_5$ is hydrogen or an alkyl group such as methyl or ethyl and R$_6$ is hydrogen, an alkyl group or an aryl group.

4. A method according to claim 3, wherein the branched alkyl group is 2-ethylhexyl, and the polyalkylene glycol residue is of the formula —[(CH$_2$)$_y$O]$_z$OMe where y is 2.

5. A method according to claim 4, wherein the branched alkyl group is 2-ethylhexyl, and the polyalkylene glycol residue is of the formula —[(CH$_2$)$_y$O]$_z$OMe where y is 2 and z is an average value of 7 to 8.

6. A method according to claim 1, wherein step (ii) is repeated twice; wherein in one instance, R$_2$ is a branched alkyl group and in the other two instances, R$_2$ is a polyalkylene glycol residue of the formula —[(CR$_5$H)$_y$O]$_z$OR$_6$ where y is an integer from 2 to 4, and z is the average number of [(CR$_5$H)$_y$O] moieties and is from 2 to 100, R$_5$ is hydrogen or an alkyl group and R$_6$ is hydrogen, an alkyl group or an aryl group.

7. A method according to claim 6, wherein the branched alkyl group is 2-ethylhexyl, and each polyalkylene glycol residue is the same and of the formula —[(CH$_2$)$_y$O]$_z$OMe where y is 2.

8. A method according to claim 7, wherein the branched alkyl group is 2-ethylhexyl, and each polyalkylene glycol residue is the same and of the formula —[(CH$_2$)$_y$O]$_z$OMe where y is 2 and z is an average value of 7 to 8.

9. A method according to claim 1, wherein the di-halo initiator of the structure halo-L-halo is:

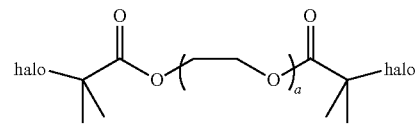

where a is an integer from 1 to 10.

10. A method according to claim 1, wherein the dithiol compound of the structure HS—R—SH is:

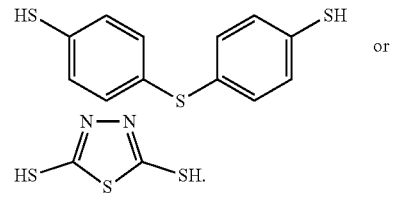

11. A method according to claim 1, wherein the transition metal-ligand complex is a copper-ligand complex.

12. A method according to claim 1, wherein the ligand used to form the transition metal-ligand complex is a nitrogen-containing ligand, more preferably a multidentate nitrogen-containing ligand.

13. A method according to claim 12, wherein the ligand used to form the transition metal-ligand complex is tris(2-dimethylaminoethyl)amine (Me$_6$TREN).

14. A method according to claim 1, wherein the catalyst used in steps (i) and (ii) is a copper complex of tris(2-dimethylaminoethyl)amine (Me$_6$TREN).

15. A method according to claim 1, wherein step (iii) is conducted in the presence of a base.

16. A method according to claim 15, wherein the base used in step (iii) is an alkylamine.

17. A method according to claim 1, wherein the catalyst used in steps (i) and (ii) is a copper complex of tris(2-dimethylaminoethyl)amine (Me$_6$TREN) and step (iii) is conducted in the presence of triethylamine.

* * * * *